United States Patent [19]

Duttine et al.

[11] 4,164,280
[45] Aug. 14, 1979

[54] ROLLER CONVEYOR

[75] Inventors: Walter Duttine, Offenbach; Helmut Kratz, Rodgau; Harald Bosch, Hausen; Gerhard Steigerwald, Mainhausen, all of Fed. Rep. of Germany

[73] Assignee: DeMag Aktiengesellschaft, Duisburg, Fed. Rep. of Germany

[21] Appl. No.: 892,340

[22] Filed: Mar. 31, 1978

[30] Foreign Application Priority Data

Apr. 2, 1977 [DE] Fed. Rep. of Germany ....... 2714862

[51] Int. Cl.² ............................................. B65G 13/06
[52] U.S. Cl. .................................... 198/781; 198/783; 198/790
[58] Field of Search .............. 198/780, 781, 789, 790, 198/783, 859, 343, 857; 193/35 H, 37, 35 B, 35 R; 29/110, 121.8, 132

[56] References Cited

U.S. PATENT DOCUMENTS

| 1,366,966 | 2/1921 | Spear | 193/35 R |
| 3,266,617 | 8/1966 | Forsyth et al. | 198/783 |

*Primary Examiner*—Robert B. Reeves
*Assistant Examiner*—Douglas D. Watts
*Attorney, Agent, or Firm*—Mandeville and Schweitzer

[57] ABSTRACT

A hesitation device is provided in a material conveying roller conveyor system which is simple and inexpensive in construction, while at the same time allows accumulation of conveyed materials with any damaging or disturbing effect upon the conveyed material. This is achieved by providing unbalancing weights in the rollers of the conveyor in the stoppage or hesitation area in combination with a driving belt for the rollers having areas of differing coefficients of friction.

7 Claims, 8 Drawing Figures

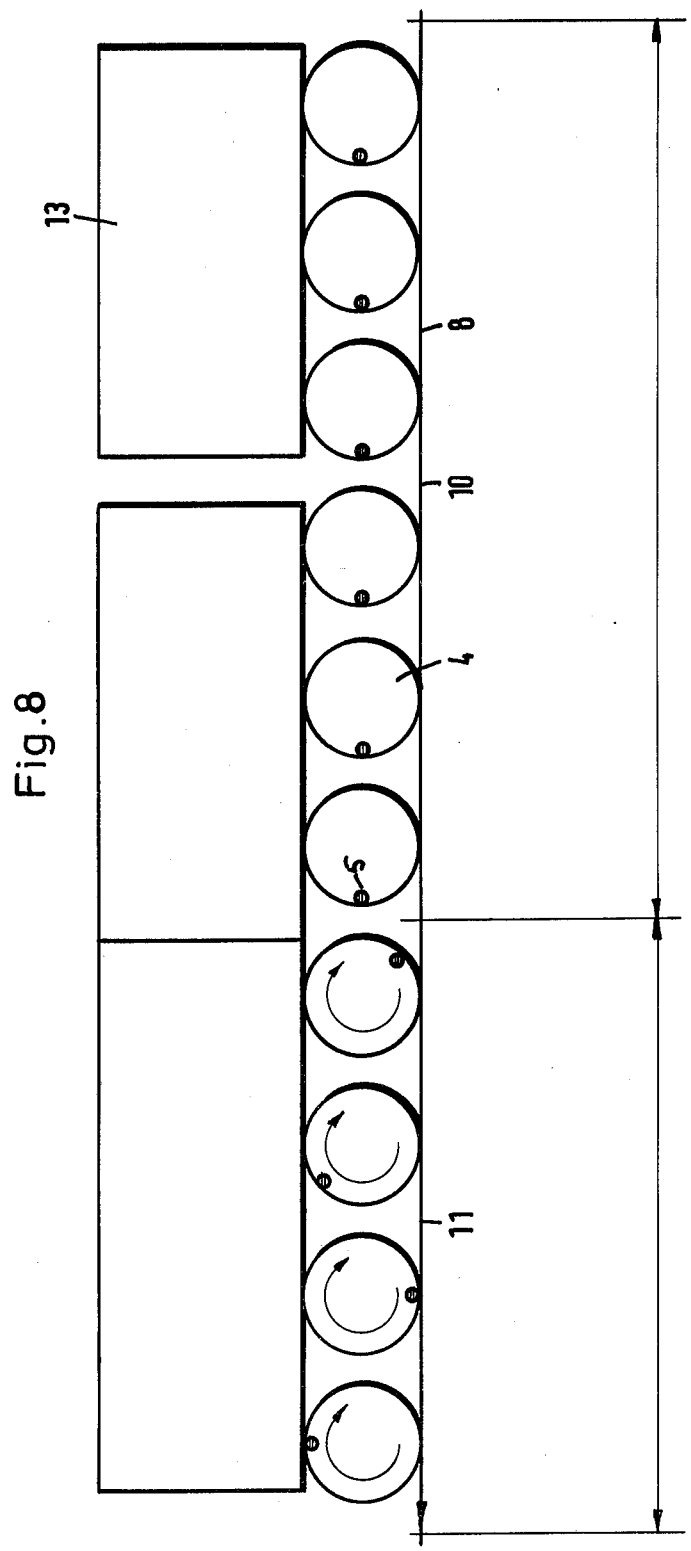

ROLLER CONVEYOR

BACKGROUND AND STATEMENT OF THE INVENTION

When conveying piece goods on roller conveyors it is necessary to provide hesitation or stoppage points or areas in the conveyor path. Conveyed material is held at these points, if required, for example, to insert other conveyed material from a feeder line further ahead on the conveyor path, to collect a number of conveyed material pieces in order to have them continue on their way in a group of a given size, or to effect certain work procedures.

It is known to achieve the stoppage or hesitation of a roller conveyor whose rollers are driven by an endless revolving belt adhering to the rollers by friction. To this end, the stoppage area is equipped with feeler levers or feeler rollers activated by the conveyed material proper and which, when pressed down by the conveyed material, cause the belt to be lifted off a number of rollers in a section preceding the switch mechanism. In this manner, the stoppage point or area remains without any drive, and the pieces of conveyed material are not squeezed together. It is therefore possible to convey delicate material. On the other hand, the extensive mechanism required for the lifting off of the belt and return to the rollers is disadvantageous. This mechanism, consisting of levers, rollers, springs and a large number of moving joints, having a length corresponding to the length of the stoppage area, is complicated and costly, since it must be resistant to disturbances.

A conveyor with a stoppage effect has been proposed which operates without a lever mechanism influencing the drive belt. In this known type of conveyor, the rollers within the stoppage area are constructed eccentrically. The distance between roller axis and drive belt running along the bottom parts of the rollers is such that between a roller and the belt a power is transmitted which is not sufficient to rotate the roller if the "thin" part of the roller is next to the belt. If, in this kind of conveyor, the material stops, the rollers come to rest in the position mentioned. The material resting on top is lifted by the degree of eccentricity while there is slippage between the material and the roller periphery. When the blockage causing stoppage is lifted, at least several rollers turn under the influence of the conveyed material on top, the "thick" part of their periphery touching the belt, and thus start to rotate. The disadvantage in this type of conveyor is that pressure results on the conveyed material, if adjustment of the roller bearings is not performed very carefully with respect to the belt. It is also disadvantageous that the material undergoes strong vibrations when passing the stoppage line. The simplified construction of this known type of conveyor is therefore overcome by considerable disadvantage during operation.

It is the object of this invention to design a conveyor with simple means in such a fashion that the pieces of conveyed material only touch each other lightly during stoppage. This effect is achieved by largely disengaging the rollers from the drive belt without activating moving parts to this end. This is solved in the invention by means of a hesitation or stoppage area roller conveyor whose rollers are rotated by a frictionally engaged endless driven belt. The belt surface facing the rollers has sections of different coefficients of friction where centrically pivoted rollers arranged within the stoppage area are provided with an unbalancing weight, and where the friction between the sections of the belt showing a small frictional coefficient and the rollers is such that the peripheral power transmitted from the belt to the rollers is less than the return momentum of the unbalancing weight, but sufficient to keep those rollers moving with conveyed material which are in rotary motion, and where the friction between the belt sections of greater frictional coefficient and rollers is such that the peripheral power transmitted from the belt to the rollers is greater than the return momentum of the unbalancing weight.

The invention is explained in greater detail by means of an illustrated example shown in the drawings.

DESCRIPTION OF THE DRAWINGS

FIG. 8 is a schematic illustration of a conveyor profile during the hesitation process of the invention.

DETAILED DESCRIPTION OF THE INVENTION

Figure 1:
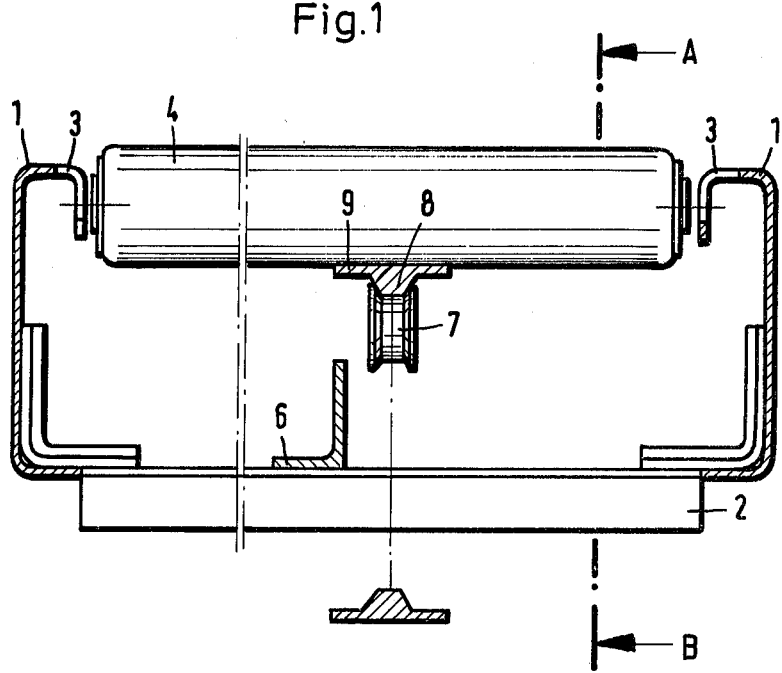
FIG. 1 is a vertical sectional view thorugh a roller conveyor system embodying the invention.

As can be seen in FIG. 1, the conveyor consists of two lateral angled brackets 1 connected to each other by a traverse brace 2. The brackets 1 are bent inward and angled downward. They are provided in spaced successive intervals, and facing each other in opposed pairs for receiving the bearings for support rollers 4.

An endless driven belt 8 runs along the bottom of rollers 4, guided through contact rollers 7. To this end, drive belt 8 is equipped with a ribbed guide 9 resting in a matching peripheral groove of contact rollers 7. The contact rollers are attached by means of angle 6 to brace 2, the former bearing a lever (not shown) whose end permits pivoted attachment of roller 7.

Figure 2:
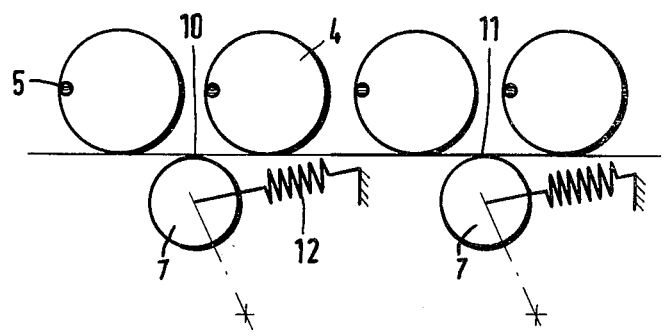
FIG. 2 is a sectional view taken along lines A–B of FIG. 1.
Figure 3:
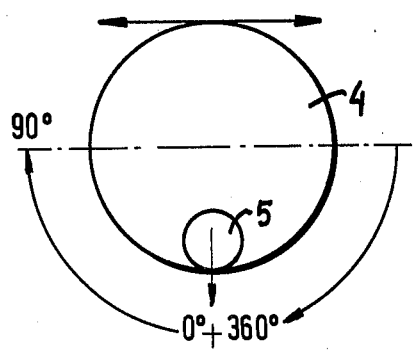
FIGS. 3–6 are schematic side elevation views of a roller of the invention shown in different sequential angular positions.

FIG. 2 shows how contact rollers 7 are maintained in operating position by means of springs 12 arranged between the levers carrying the contact rollers, and fixed points in the frame. By changing the position of the fixed point in the frame the tension of springs 12 can be altered, thereby altering the degree of contact or pressure of belt 8 on rollers 4. Since contact rollers 7 are preferably arranged between rollers 4 carrying the conveyed material, as shown in FIG. 2, they cause belt 8 to adhere to the bottom part of rollers 4 with a certain embracing angle.

The special feature of rollers 4 consists in their having been provided with an unbalancing weight 5, as long as they are arranged within the stoppage area. Weight 5 can be created simply by welding a weight to the roller shell. By way of example only, rollers of a diameter of 50 mm are provided with weights of approximately 300 g. to cause unbalance in order to achieve the mode of operation explained in detail below. As indicated in FIGS. 2 to 8 schematically, the endless belt is provided for the major portion of its length on the surface facing rollers 4 with a relatively small coefficient of friction. It has, however, at least one section where the mentioned surface has a higher coefficient of friction.

Figure 4:
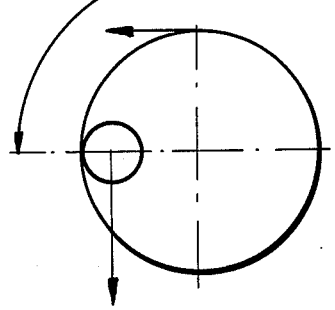
Figure 5:
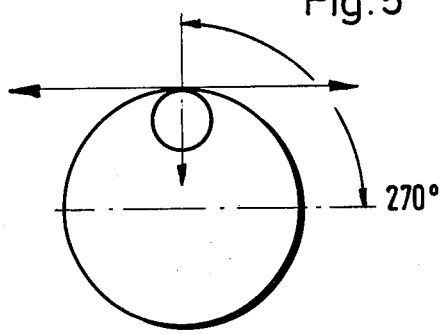
Figure 6:
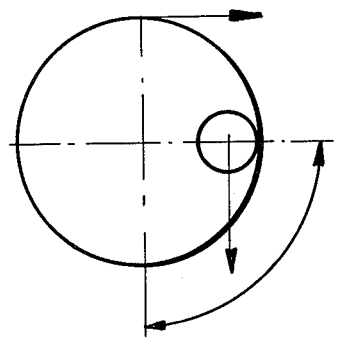

The mode of operation of the new type of stagnation roller conveyor is as follows. Due to the frictional engagement existing between belt 8 and rollers 4 carrying the conveyed material 13, a peripheral power $Fu_{Friction}$ results at roller 4 as soon as the belt is driven. This peripheral power $Fu_{Friction}$ is superimposed by a peripheral power caused by weight 5 and described as $Fu_{Weight}$. This superimposed peripheral power which could also be taken as return momentum, reacts during rotation of roller 4 by 360° in the manner shown in FIGS. 3 to 7. From position 0° (FIG. 3) it increases from 0 to its maximum value occurring at position 90° (FIG. 4). It then decreases back to 0 at position 180° (FIG. 5), to reach with opposite power direction again its maximum value at position 270° (FIG. 6), from where it again decreases to 0 (FIG. 3) at position 360°.

Figure 7:
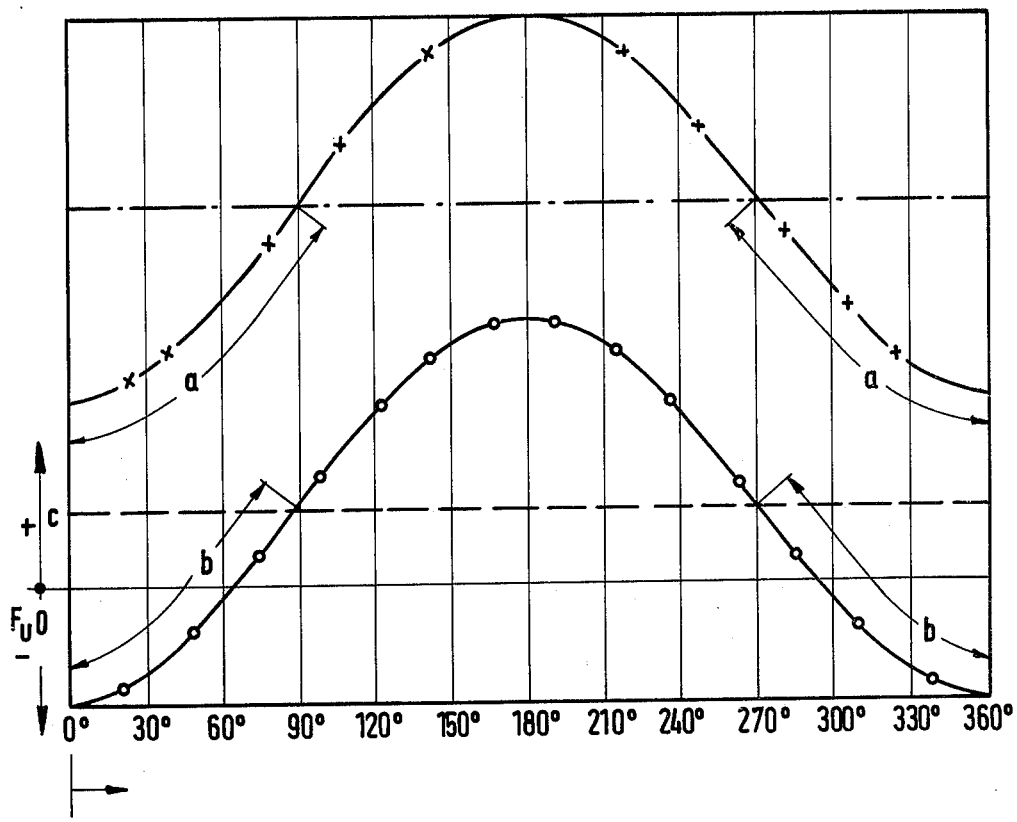
FIG. 7 is a graphic illustration of conditions occurring at a conveyor roller during operation.

FIG. 7 shows peripheral power Fu in vertical direction, angular positions of the respective support rollers appear in horizontal direction. The broken line drawing of horizontal line c above the 0-line indicates the value of the peripheral power which must be applied to a normal roller to overcome its bearing friction and the resistance offered by the conveyed material. If power Fu acts in the opposite direction of Fu transmitted by the belt, and if drive belt 8 is aligned with section 11 (FIG. 8) having the high frictional coefficient, engaged with the respective support roller, FIG. 7 shows that the roller receives a transmission of peripheral power Fu whose value and course appears on section a of the upper sine curve. Even the least peripheral power exerted hereby is—due to the high frictional coefficient at the belt—greater than Fu required for rotation of a roller, such Fu value being indicated by line c already mentioned. Thus the support roller is rotated despite the return momentum from the unbalancing weight, and continuously driven, even if it had been standing still.

There are different circumstances, however, if section 10 with the low frictional coefficient has influence on a roller 4 which is standing still. This section, due to the low frictional coefficient, exerts a peripheral power Fu on a roller 4, whose course is indicated in section b of the lower curve on FIG. 7. The peripheral power is not sufficient to overcome the return momentun of the unbalancing weight. Therefore, the roller remains standing still. If, however, the roller is already rotating, it is maintained in rotation by the belt section with the low frictional coefficient as the peripheral power—as also indicated by the lower curve on FIG. 7—between positions 90° and 270° exceeds minimum c required for rotation.

The practical effect of the conditions described is that during stoppage of the conveyed material no notable drive power is transmitted from the belt to the rollers, if the belt runs along with the section of low coefficient of friction, as the rollers, provided with unbalanced weight turn, at least one by one, to the 0° position or a neighboring position.

Once the block causing the stoppage effect on the conveyor is lifted, the conveyed material passes the stopped line, whether the rollers 4 are driven by the belt section with the lower or by the belt section with the higher frictional coefficient. If, however, the conveyed material is retained by a block as mentioned, the motive power is decreased to an extremely low value, if it is transmitted by the belt section with the low frictional coefficient. During the passage of a section with higher frictional coefficient, the pressure does increase on the conveyed material. This increase, however, is very limited, since the section mentioned need only be dimensioned so that, when lifting the block, rollers and thus the conveyed material start moving again. The section with the higher frictional coefficient can be kept short with respect to the entire length of the belt. The distance between two successive sections of this kind only affects the time that passes under the most severe conditions, until the conveyed material starts moving again after lifting the block. As soon as the rollers are rotating again after lifting the block, the peripheral power transmitted by the section with the low frictional coefficient will be sufficient to maintain the conveying motion. The conditions during stagnation are shown schematically in FIG. 8 showing conveyed material 13.

We claim:

1. A material hesitation system for a roller conveyor line, comprising
    (a) a plurality of spaced rollers defining a hesitation area;
    (b) an endless drive belt frictionally engaging said plurality of rollers; the improvement characterized by
    (c) an unbalancing weight disposed in each of said plurality of rollers adjacent the periphery thereof;
    (d) the surface of said drive belt facing said rollers having alternating areas of high and low coefficients of friction;
    (e) the power transferred from said low frictional coefficient areas to said rollers being below that required for the return momentum of said unbalancing weights, but sufficient to maintain momentum of already revolving rollers; and
    (f) the power transferred from said high frictional characteristic areas being greater than the return momentum of said unbalancing weights.

2. The apparatus of claim 1, further characterized by
    (a) a plurality of movable contact rollers positioned on the side of said drive belt opposite said plurality of conveyor rollers for pressing said belt against said conveyor rollers.

3. The apparatus of claim 2, further characterized by
    (a) said contact rollers positioned along said belt between said conveyor rollers.

4. The apparatus of claim 2, further characterized by
    (a) the contact power of said contact rollers against said belt is controlled.

5. The apparatus of claim 2, further characterized by
    (a) each said contact roller mounted on a pivotal lever; and
    (b) each said lever is spring biased toward said drive belt.

6. The apparatus of claim 5, further characterized by
    (a) said spring bias of each said contact lever is adjustable.

7. The apparatus of claim 1, further characterized by
    (a) the distance between two areas of high coefficient of friction is substantially the same as the length of the hesitation area of said system in a roller conveyor line.

* * * * *